United States Patent [19]

Merlino, Jr. et al.

[11] 3,849,631

[45] Nov. 19, 1974

[54] PUNCHED CARD, BADGE AND CREDIT CARD READER

[75] Inventors: Eugene Louis Merlino, Jr., Dearborn Heights; Earl Edward Brinning, Detroit; Roger Stanley Naeyaert, Grosse Pointe Woods, all of Mich.

[73] Assignee: Burroughs Corporation, Detroit, Mich.

[22] Filed: Mar. 4, 1971

[21] Appl. No.: 120,867

[52] U.S. Cl. ....................... 235/61.11 B, 235/61.7 B

[51] Int. Cl. .......................................... G06k 7/015

[58] Field of Search...235/61.11 B, 61.11 C, 61.11 E; 271/57

[56] References Cited

UNITED STATES PATENTS

| | | | |
|---|---|---|---|
| 3,018,951 | 1/1962 | Harris | 235/61.11 C |
| 3,227,860 | 1/1966 | Blodgett | 235/61.11 C |
| 3,229,073 | 1/1966 | Macker | 235/61.11 E |
| 3,627,990 | 12/1971 | Sallach | 235/61.11 E |

*Primary Examiner*—Gareth D. Shaw
*Assistant Examiner*—Robert F. Gnuse
*Attorney, Agent, or Firm*—Manuel Quiogue; Albin H. Gess; William B. Penn

[57] ABSTRACT

A card reader capable of automatically reading coded information from cards of at least two predetermined widths, the information being encoded in information fields that may vary in the length of columns and rows from card to card, such fields being referenced with respect to two predetermined orthogonal edges on each card. Movable stop fingers and a guiding edge facilitate aligned insertion of a card with respect to the two orthogonal edges. When a card is being advanced through the reader past a reading station, a circuit that is triggered by a column count wheel generates a signal each time that a column of information is in position to be read. This circuit is inhibited by switches that respond to cards of predetermined widths when the trailing edge of a card passes their position, the location of the switches having a predetermined relationship to the last line of coded information to be read on the individual type of card. The circuit can also be inhibited by a signal generated by an encoder upon its detection of an end of text code in the information field. The card reader is shut off at the end of each read cycle by an independent switch responsive to the trailing edge of all cards inserted into the reader.

20 Claims, 7 Drawing Figures

FIG. I

INVENTORS
EUGENE LOUIS MERLINO, JR.
EARL EDWARD BRINNING
ROGER STANLEY NAEYAERT
BY Albin H. Gess
AGENT

PUNCHED CARD, BADGE AND CREDIT CARD READER

BACKGROUND OF THE INVENTION

The present invention relates to card readers and more particularly to punched card readers that are capable of accepting cards of at least two predetermined widths without the necessity of manually adjusting the reader prior to switching from one size card to another.

In the field of terminal units for computer systems, which are now used, for example, in plants, warehouses, hospitals, financial and educational institutions, and in departmental offices within a building, to collect data for storage in a central computer or make an inquiry of the central computer, operational flexibility and simplicity have been a much sought-after goal. Prior inventions have sought to simplify these terminal units by providing card readers in association with a keyboard to deliver data to the central unit. The card readers employed in this context lacked versatility, however, in that they could only accept one size card. For example, U.S. Pat. No. 3,304,410 is directed to a card reader for standard punched cards and U.S. Pat. No. 3,304,411 is directed to a card reader for a smaller size card, such as a credit or identification card.

In an environment such as a teller's station in a bank, a need arises for a card reader that is capable of reading cards of various known sizes. For example, a customer in possession of a credit card or other identification card, approximately the size of a standard credit card, may desire to deposit or withdraw sums from an account he has with the bank. A card reader that is capable of reading cards of different known sizes and different field arrangements could read such information as the customer's account number and other identifying indicia from a credit card and transmit it directly to the central computer. Any instructions thereafter, such as debit or credit instructions that are connected with the transaction could be dictated by a punched card of a different size, a standard tabulating card, for example.

The fastest and most efficient prior art card readers are generally of a continuous reading type which sense the information field on the card and provide signals to an encoding circuit while the card is in motion. It becomes necessary in this type of situation to provide a column indicating signal to indicate to a collecting unit when an information column on the card is in the reading station. This signal is required to tell the digital computer or other utilizing apparatus that the decoding circuit is now developing useful output signals. There are many diverse prior art schemes and devices to accomplish the generation of column indicating pulses in continuous reading card readers. One scheme is shown in U.S. Pat. No. 3,229,073. The prior art apparatus for accomplishing the generation of these signals, however, is directed towards a machine that is only capable of accepting cards of one physical size and one information field pattern.

A card, such as a credit card, which is limited in size presents a special problem to a continuous reading card reader since it contains only a comparatively few lines of information with the lower section of the card embossed for visual reading and imprinting. The embossments tend to create spurious signals in the reader. Consequently, signals from the reading apparatus must be inhibited immediately after the last relevant line of punched information has been read. Because of the limited space on a credit card for the punched information field, however, it is not desirable to use any of this space to produce a signal to inhibit signals from the apparatus.

A card reader that can accept and process cards of different widths and lengths having information fields thereon that vary in length, therefore, requires an accurate column indicating system and a system for inhibiting the column indicating system immediately after the last information bearing column in the information field of the card is read.

It is, therefore, an object of this invention to provide a card reader capable of processing a standard size punched card, such as a tabulating card, a standard punched identification badge, or a punched credit card, for example, so as to produce accurate column indicating signals for all such cards after they are properly inserted and the machine is turned on; and to inhibit the output of the column indicating apparatus of the reader after the last information bearing column to be read in the information field on the respective card is read.

It is a further object of this invention to provide a card reader capable of inhibiting the output of the column indicating apparatus of the reader after the last relevant information bearing column in the information field is read although such column may not be the last column in the field.

SUMMARY OF THE INVENTION

An apparatus for individually reading, on command, punched cards of at least two predetermined widths, the information fields of all the cards having a precise alignment with two orthogonal edges of the card, the last row of information to be read on a card of a given width having a known geometrical relationship with the trailing edge of the card. The apparatus includes: surfaces for properly aligning an individual card in the reader with respect to the orthogonal edges, whereby the first row of information to be read is indexed at the reading station; column indicating apparatus, including circuitry effective with starting the device for emitting pulses at each column on the card; sensors physically located with respect to the reading station for detecting the trailing edge of the card at the time the last column of information to be read is at the reading station to cause inhibition of pulses from the column indicating apparatus, these same sensors being located to identify different widths of cards as required; and an independent sensor for detecting the trailing edge of all cards and shutting off the apparatus. A feature of the apparatus is a column count wheel pinned to the shaft carrying the card feed rollers for counting every other column of punched information and circuitry for generating precisely timed intermediate pulses.

BRIEF DESCRIPTION OF THE DRAWINGS

The many advantages of this invention will be readily appreciated as the same becomes better understood by reference to the following detailed description when considered in connection with accompanying drawings, in which like reference numerals designate like parts throughout the figures thereof and wherein.

DESCRIPTION OF THE PREFERRED EMBODIMENT

Figure 1:
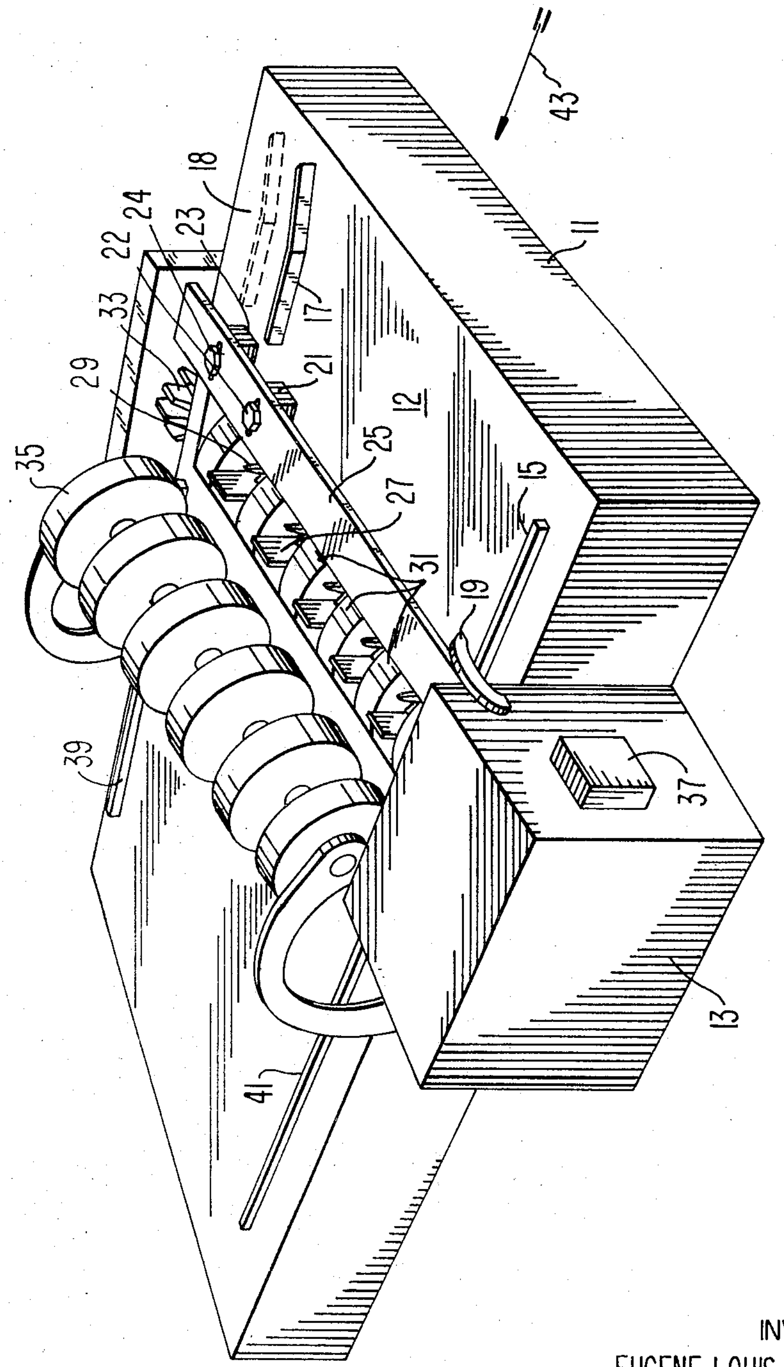
FIG. 1 is a perspective view of a card reader embodying the present invention.

FIG. 1 shows punched card and badge switch 21 mounted on support 25 ahead of and in apart relationship to credit card switch 23 which is also mounted on support 25. These two switches are located in front of reading star wheels 29 so that they respond to the leading edge of a card being inserted in direction 43, prior to reading star wheels 29 being affected, and they, therefore, also respond to the trailing edge of the card, prior to the trailing edge passing through the reading area. Punched card and badge switch 21 and credit card switch 23 are preferably mounted so as to be movable with respect to reading star wheels 29 and with respect to reference edge 15 by any convenient means, such as slot and holding nuts 22 and 24, for example.

Column count wheel 33 is mounted on the same shaft that carries feed rollers 31 in spaced apart relationship, thereby rotating in synchronism with feed rollers 31. Feed rollers 31 have a diameter that requires the rollers to rotate twice in order to move a standard 80 column punched card past reading wheels 29. With this arrangement, only one revolution of rollers 31 is required to move a badge or credit card through the reader, because the badge and credit card are approximately half the length of the standard 80 column punch card.

With the rollers 31 and, therefore, column count wheel 33 making two revolutions for the passage of one 80 column punch card, only 40 teeth are required on the column count wheel to be able to indicate for 80 columns. If the column count wheel is used to trigger a logic circuit, of the type illustrated in FIG. 3 and explained hereafter, which supplies two pulses for each pulse generated by the column count wheel, the number of teeth on column count wheel 33 may be reduced to 20, and still be sufficient to indicate for 80 columns. It is also clear that this arrangement will be capable of indicating for any number of columns less than 80.

Considering a badge or credit card that carries, for example, approximately 22 and 15 columns of information, respectively, only one revolution of a column count wheel which has only 20 teeth in conjunction with one revolution of drive roller 31 will cause sufficient pulses to be generated out of the above-mentioned logic circuit to indicate the maximum number of information columns carried by both the badge and the credit card.

The specific method of sensing the movement of teeth on the column count wheel past a reference point to indicate when a column of information is being read is old in the art. Explanation of such a method is not seen as necessary here.

Figure 2:
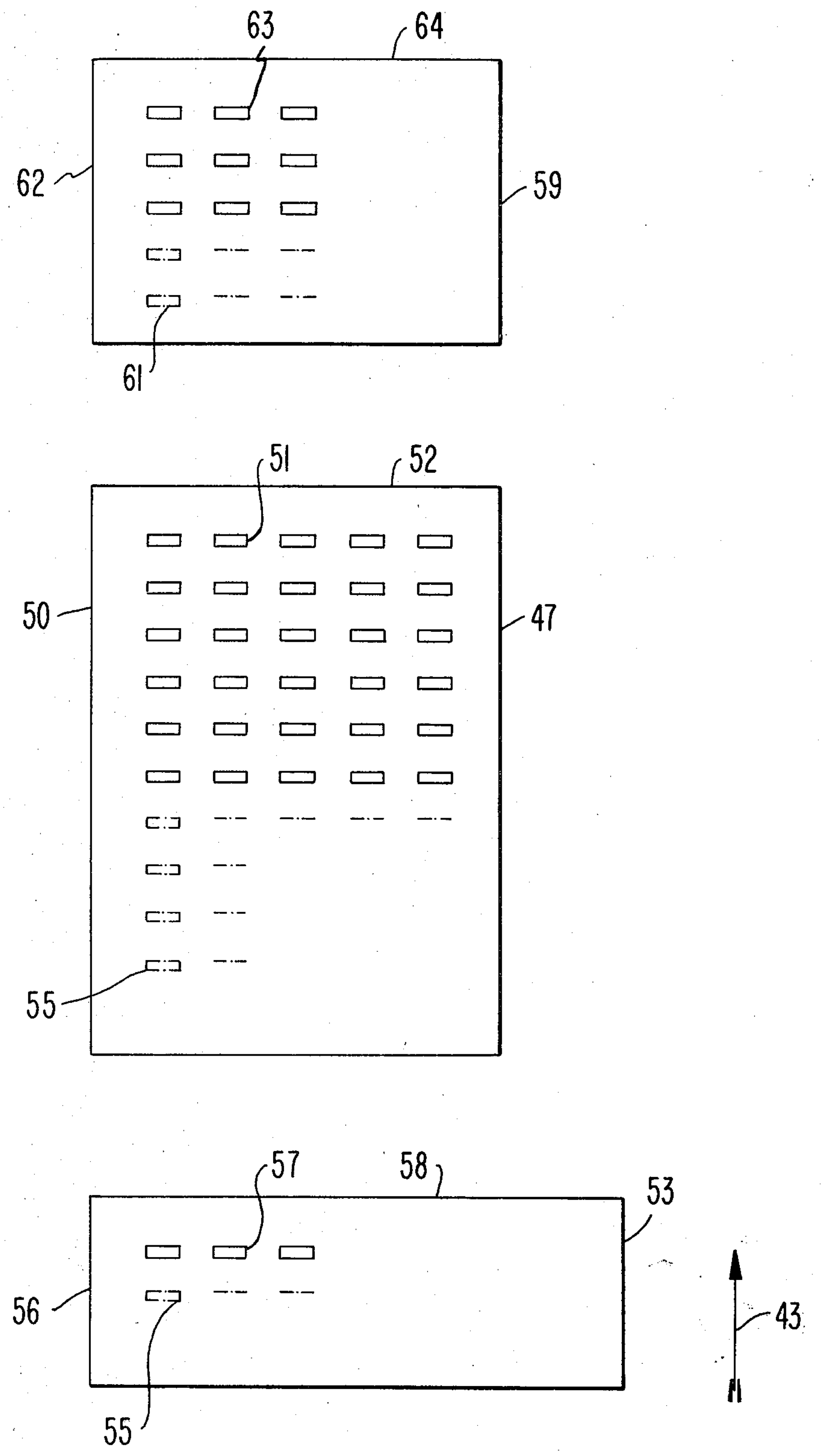
FIG. 2 illustrates three cards, varying in physical size and having different information field sizes, that the reader of FIG. 1 will accept.

FIG. 2 illustrates the three types of cards, discussed above, that may be processed through the reader of FIG. 1 in direction 43. Punched card 47 represents a standard 20 to 80 column tabulating card. Punched card 53 represents a credit card bearing up to 15 columns of punched information. Card 59 represents a plastic badge with up to 22 columns of punched indicia thereon.

As can be seen, the information field of each card, that is, the length of columns and the length of rows, varies from card to card as do the physical sizes of the cards. The only necessary standardization of the information field is the physical location of the lead column, column 51 of card 47, column 57 of card 53 and column 63 of card 59, with respect to an edge that is orthogonal with the lead edge. Of course, the spacing between rows and between columns is the standard spacing utilized in the art.

Figure 3:
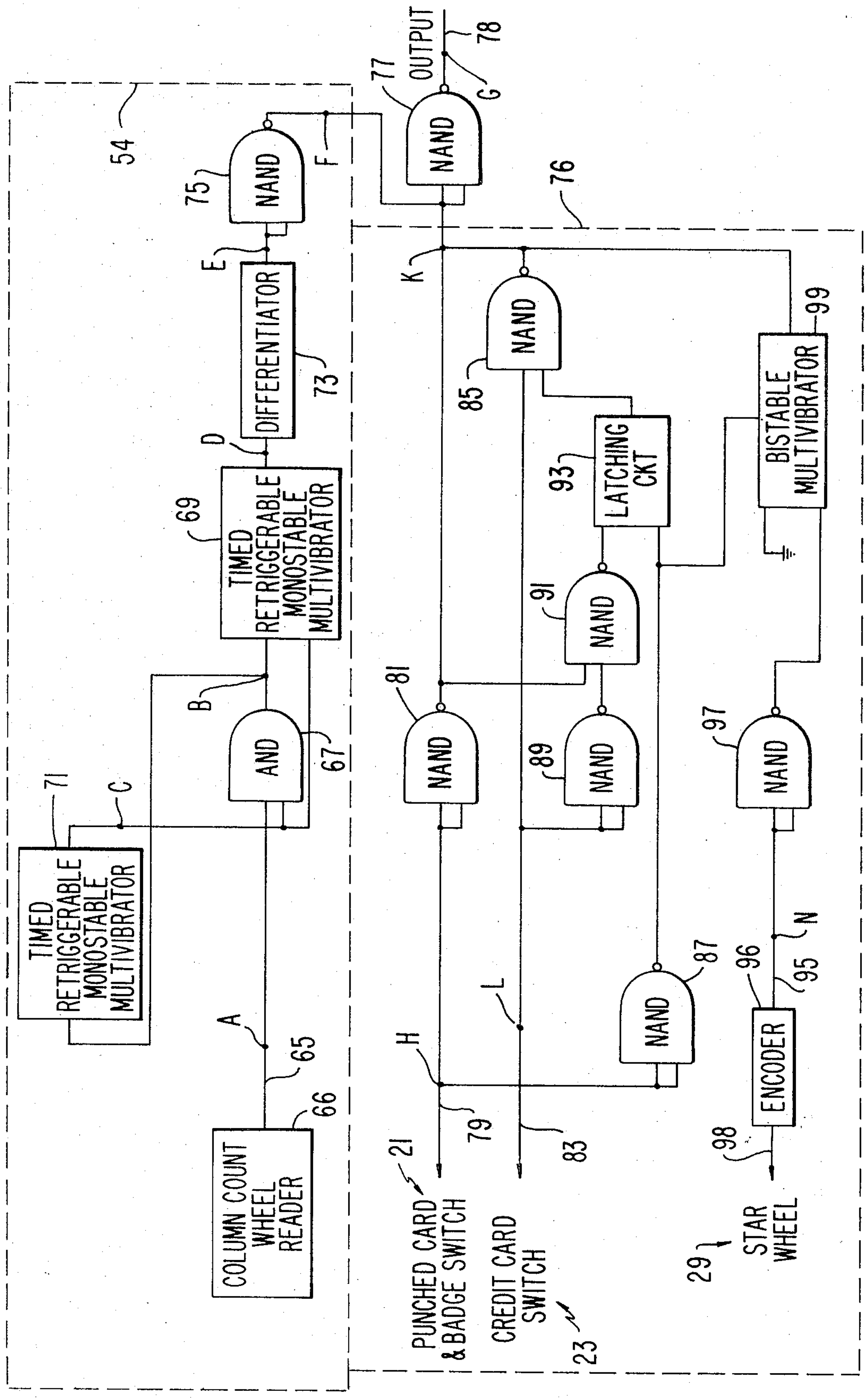
FIG. 3 is a schematic illustration of a circuit that generates colugn count signals and circuitry for inhibiting generation of these signals.

Referring now to FIG. 3, there is shown a logic circuit that could be used for responding to the column count pulses generated by column count wheel reader 66 and inhibited by the punched card and badge switch 21 or credit card switch 23 or an end of transmit signal generated by an encoder in response to the star wheels sensing an end of transmit code on the information field. Lead 65 is connected to column count wheel reading device 66 which reads column count wheel 23. Lead 79 is connected to punched card and badge switch 21. Lead 83 is connected to credit card switch 23. Lead 95 is connected to encoder 96 which may be of any type well known in the art. Lead 78 is the output of the circuit of FIG. 3 and the signal on that lead, if not inhibited, comprises a string of pulses, one pulse for each time a column of information is being read by star wheels 29.

The basic elements of pulse generation section 54 of the circuit of FIG. 3 are arranged in the following manner: AND gate 67 receives signals over line 65 from column count wheel reader 66 and supplies signals to monostable multivibrators 69 and 71. Monostable multivibrator 71 has its output fed back into the input of AND gate 67 besides having that output fed into a second input of monostable multivibrator 69. The output of multivibrator 69 is connected to differentiator 73 which has its output connected to NAND gate 75.

The output of pulse generation section 54 through NAND gate 75 is double the number of pulses received from column count reader 66, as explained more fully hereinafter. The pulses from NAND gate 75, if not inhibited are fed to output NAND gate 77, which produces the column count pulses desired. This output is supplied to and utilized by an information responsive or storage device of a type well known in the art. One method of utilizing these column indicating pulses is shown in U.S. Pat. No. 3,229,073.

The inhibit section 76 of the circuit is arranged in the following manner. NAND gate 81 is responsive to signals over line 79 from punched card and badge switch 21 and supplies signals directly to output NAND gate 77. NAND gate 85 is responsive to signals over line 83 from credit card switch 23 and from the output of latching circuit 93, latching circuit 93, in turn, being responsive to the signals from both the card-badge switch and the credit card switch. This responsive occurs because NAND gate 89 receives a signal from credit card switch 23 and supplies it to one input of NAND gate 91, the other input of NAND gate 91 being the inverse of the signal from the card-badge switch 21. The output of NAND gate 91, in turn, supplies one input of latching circuit 93. The other input of latching circuit 93 is supplied by NAND gate 87 which is receiving signals from the card-badge switch 21.

NAND gate 97 receives any end of text signals generated by encoder 96 in response to signals received from the reading star wheels over line 98, and transmits them to bistable multivibrator 99 which, in turn, also transmits signals to the input of NAND gate 77. NAND gate 87 supplies the other input to bistable multivibrator 99.

The operation of the pulse-generating and inhibit sections of this circuit will be explained in connection with the pulse diagrams of FIGS. 4 through 7.

Turning first to the mechanical operation of the reader shown in FIG. 1, let us assume that identification card 59 (FIG. 2) is going to be processed. Card 59 is inserted into the reader by placing edge 62 against stationary guide 15, the opposing edge being guided by movable guide 17 which is biased towards guide 15 but is capable of movement to a limit position 18. Since card 59 is narrow with respect to a card such as credit card 53, movable guide 17 will not be forced outwardly very far. Card 59 is manually pushed forward until its leading edge 64 abuts against stop fingers 27. These fingers are so arranged that star wheels 29 will be in front of and poised to drop into first column 63 of the information field on the card. Column count wheel 33, which we have assumed has 20 teeth, is set into a start position by mechanical reset mechanism 13 in a manner that is well known in the art. The mechanism 13 positions count wheel 33 so that when leading edge 64 abuts stop fingers 27 thereby causing star wheels 29 to be poised to drop into the first column in the information field, one of the teeth of the count wheel is poised to actuate column count wheel reader 66 (FIG. 3). Since the distance from the leading edge to the first information column is standard for each card used, the above relationship will be true for each card processed. Therefore, in this position with edge 62 against movable stop fingers 27, the card is properly orientated for start of the reading cycle.

During the insertion process, card 59 will actuate punched card and badge switch 21 and mechanical reset switch 19, card-badge switch 21 being located at a spot in the path of travel of card 59 with respect to reference edge 15 and the reading star wheels 29 so that it will be triggered and deactuated by all cards inserted into the reader and particularly deactuated by the trailing edge of punch card 47 immediately after the last relevant column of information in the information field on punch card 47 is read. Since badge card 59 is approximately half the length of punch card 47 and carries approximately one-fourth the number of columns, the above mentioned location of switch 21 with respect to the last column on card 47, will cause the trailing edge of card 59 to deactuate switch 21 after the information field on card 59 has passed reading star wheels 29.

To start the reading process, read start button 37 is pressed causing the mechanical mechanism 13, which contains a drive motor and mechanical reset devices (not shown) for continuous drive card readers that are well known in the art, to be actuated, thereby causing stop fingers 27 to drop below surface 12 of base 11, just prior to the time that rollers 31 start turning and pressure rollers 35 are dropped to engage the top surface of card 59. Apparatus for lowering and raising the stop fingers and for actuating and deactuating the drive rollers is known in the art and is not a part of this invention. As drive rollers 31 turn, column count wheel 33 generates a pulse every other time that a column of information is being read by star wheels 29. As explained earlier, column count wheel 33 will only generate a pulse for every other column if the number of teeth it carries correspond to half the number of columns encountered by the reading star wheels during one revolution of the drive rollers. This arrangement is preferred because manufacturing tolerances decrease and quality and consequent cost increases as the number of teeth on a circumference of the size used in desk top units approaches eighty.

The reading of information by star wheels is well known in the art. U.S. Pat. No. 2,938,667 shows one of the many possible arrangements.

The card 59 will proceed through the reader until its trailing edge reaches switch 21 and mechanical reset switch 19. At this point, switch 21 causes inhibition of column count pulses and switch 19 causes reset devices within mechanical mechanism 13 to be actuated and stop drive rollers 31 after a short time lag, thereby insuring that the end of the card has passed the reading star wheels and a major portion of the card is out on the other side of the reader, being guided by stationary guides 41 and 39. Besides stopping drive wheels 31, the reset devices cause pressure rollers 35 to move back to their open position, as shown in FIG. 1, cause column count wheel 33 to be orientated into a start position, and cause stop fingers 27, which had been in a depressed position below surface 12, to be re-elevated above surface 12. The inhibition of the pulse generation section of FIG. 3 by the deactivation of switch 21 will be hereinafter explained.

Standard tabulating card 47, upon being inserted into the reader, since it is the same width as identification card 59, will also only actuate switch 21. The only difference in machine operation between identification card 59 and tabulating card 47 is that the reading cycle will be longer since the number of columns 51 of the card is greater. As stated earlier, switch 21 is located in the path of travel of standard tabulating or punch card 47 and identification card 59 at a predetermined distance from the location of reading star wheels 29 so that the trailing edge of punch card 47 will trigger switch 21 immediately after the last relevant column of information in the field is read. This is accomplished by placing switch 21 at a distance from reading star wheels 29 that is slightly less than the distance from the trailing edge of the punch card to the last relevant column to be read by star wheels 29. Thus, switch 21 will be activated immediately after that column passes by the star wheels.

Let us now assume that credit card 53 is inserted into the reader. Since card 53 is inserted with longer side 58 as its leading edge and with shorter side 56 abutting stationary guide 15, the opposite shorter side of card 53 will cause movable guide 17 to move outwardly towards limit position 18 to give the card enough room to pass into the reader. The credit card is inserted until leading edge 58 abuts against stop fingers 27. Because credit card 53 is wider than cards 47 and 49, credit card switch 23, as well as switch 21, will be actuated as the card is moved into position against movable stop fingers 27.

Upon depression of read start button 37, stop fingers 27 drop below surface 12, pressure rollers 35 drop onto the face of credit card 53 and feed roller 31 proceeds to rotate, as explained above in connection with cards 59 and 47. While star wheels 29 are sensing the information field column by column, column count wheel 33 generates a signal each time every other column is being read by the star wheels. When the trailing edge of card 53 passes under mechanical reset switch 19, the mechanism will be reset as explained above. The trailing edge of card 53 will deactuate both switches 21 and 23, thereby inhibiting the output of the pulse generation section of the circuit of FIG. 3.

Since a credit card carries coded information in its upper leading portion, the lower portion being embossed for optical reading or for impresing on sales or other documents, it is important that signals from the card reading mechanism be inhibited immediately after the last relevant column of information on the credit card is read, and before the embossed portion of the card passes the reading wheels 29. The credit card switch 23 is therefore located sufficiently distant from the reading wheels to sense the trailing edge of the credit card and consequently inhibit signals from the column generating circuit 54 as soon as the last relevant column of information has been read. Because the distance from the trailing edge of the credit card to this last relevant column of information is usually greater than the same measure on a tabulating card or identification badge, switch 23 is necessarily positioned farther back from the reading wheels than is switch 21. It is apparent that as to either switch 21, positioned for punched card 47 and identification badge 59, or switch 23 positioned for credit card 53, the switches may be physically located to be deactivated by the trailing edge of the card after the last line of coded information on the card is read or after any selected preceding line is read.

Since credit card 53 activates both switch 21 and switch 23, its trailing edge will deactivate both switch 21 and switch 23. The circuitry of FIG. 3, as will be explained, utilizes the interrelated activation and deactivation of these two switches when a credit card is inserted to inhibit the column indicating signals immediately after the last relevant information column passes the reading star wheels 29.

Turning now to the operation of the circuit of FIG. 3, column strobe generation section 54 will be explained first. Column count wheel 33 (FIG. 1) causes column count wheel reader 66 to generate a pulse every other time that a column is being sensed by star wheels 29. The circuit of FIG. 3 is initiated by these pulses, which appear on line 65, to produce a pulse on output line 78 every time a column of information is being sensed by star wheels 29. The internal operation of the circuit will be explained by reference to FIGS. 4 through 7 which illustrate the signals present in the circuit at various points in the circuit at various times.

During the time that column count wheel 33 is not causing generation of a pulse, the signal on line 65, point A of FIG. 3 at time $t_0$, is riding at a high. A high quiescent state was arbitrarily chosen for this input to AND gate 67. The circuit could be made to function in response to a low quiescent state on line 65 with only minor changes that are seen as well within the purview of one having ordinary skill in the art.

At the same instant that point A is high, point B, the output of AND gate 67, as well as point C, the output of multivibrator 71, which is of any type well known in the art, is at a high. Also, point D, the output of monostable multivibrator 69, which is of a type well known in the art, is at a low while point E, the output of differentiator 73, is riding at a sufficient voltage to be considered a high, although not a maximum high. Point F, the output of NAND gate 75, therefore, is at a low causing the output of NAND gate 77, point G, to be high. These states are illustrated in FIG. 4.

At time $t_1$, column count wheel 33 starts to generate a signal by causing point A to drop to a low. This causes point B to drop to a low, triggering timed monostable multivibrator 71 to trigger output C to a low and start timing and triggering timed monostable multivibrator 69 to trigger output D to a high and start timing.

Figure 4:
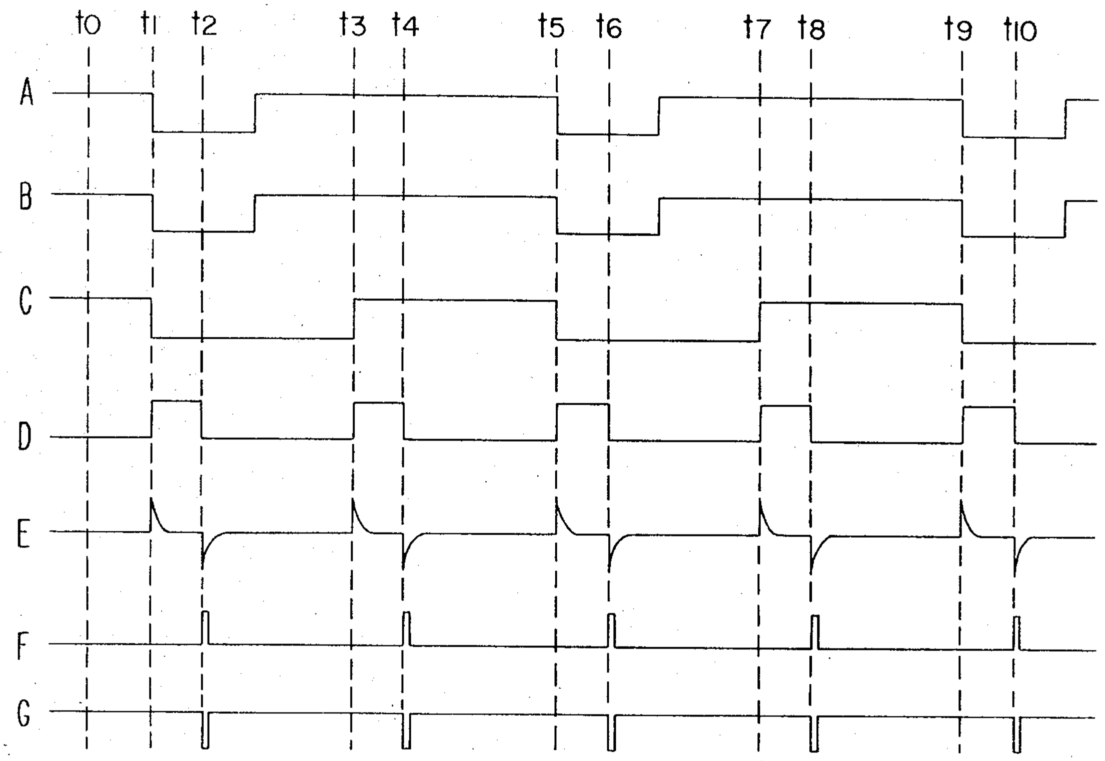
FIG. 4 (A–G) is a series of pulse diagrams indicating various waveforms that are present throughout the generating section of the circuit of FIG. 3, at various points in time.

Because point D goes from a low to a high at $t_1$, differentiator 73 causes point E to go higher in the manner seen at FIG. 4. Point F, the output of NAND gate 75 will not change because its input was already at a high and it would take a low to change its output. This, of course, leaves point G high.

At time $t_2$, monostable multivibrator 69 times out and causes point D to drop back to a low level. This causes differentiator 73 to produce a negative going spike at point E which, because of NAND gate 75, will cause a positive going pulse at Point F. Thereby a negative going pulse at point G will be produced, if point K, the input to NAND gate 77, has not been placed at a ground potential or low by the inhibit section of the circuit.

At time $t_3$, monostable multivibrator 71 times out and output C goes positive. Time $t_3$, as can be seen by FIG. 4, occurs during a time when the signal at point A is high thereby indicating that no signal is being received from column count wheel reader 66. The transition of the output of timed monostable multivibrator 71 from a low to a high at $t_3$ will again trigger monostable multivibrator 69 to change its output, point D, from a low to a high and start timing.

The transition from a low to a high at point D, as was seen at $t_1$, will again cause a positive going spike at point E. Again, because of NAND gate 75, there is no effect at point F or point G. At $t_4$, the output of timed monostable multivibrator 69 drops to its stable low state causing a negative going spike to appear at point E which causes NAND gate 75 to produce a positive going output at point F, which in turn causes a negative going output pulse to appear at point G.

It can be seen, therefore, that for one negative going pulse between $t_0$ and $t_4$ at point A, two sharp negative going pulses have been generated at point G. The exact point in time that these pulses appear at point G can be controlled by adjusting the time factor of multivibrators 69 and 71. Thus, the pulses appearing at point G can be adjusted to accurately indicate each time that a column of information is being sensed by the reader.

Between $t_4$ and $t_5$, the generating section of the circuit is again in the state it was in at $t_0$, waiting for point A to drop. This will occur at $t_5$, causing point B to drop, causing monostable multivibrator 69 to trigger, changing point D, its output, to a high and causing it to start its timing cycle. Monostable multivibrator 71 is triggered at the same time causing its output, point C, to go low and start its timing cycle.

Points E, F, and G go through the same responses at $t_5$ that were seen at $t_1$. At $t_6$, monostable multivibrator 69 times out causing point D to go from a high to a low, thereby causing the output of differentiator 73 to drop from a high to a low, which causes point F, the output of NAND gate 75, to go from a low to a high, thereby generating a negative going pulse at point G. A short time thereafter at $t_7$ monostable multivibrator 71 times out causing point C to go from a low to a high which retriggers monostable multivibrator 69, causing its output to go from a low to a high and start timing. Points E, F, and G thereby see the same type of waveform at $t_5$, $t_6$ and $t_7$ as they saw at times $t_1$, $t_2$, and $t_3$. At time $t_8$, monostable multivibrator 69 times out again and drops from a high to a low causing a negative going spike to be seen at point E, thereby causing NAND gate 75 to produce a positive going pulse at point F which creates a negative going pulse at point G.

At this point, it can be seen that during the time period $t_0$ to $t_8$, in response to two negative going pulses at point A, four sharply defined negative going pulses were produced at the output, point G. This cycle will continue repeating itself and generating column indicating signals at points $t_{10}$, $t_{12}$, $t_{14}$, $t_{16}$ and so on, until a ground or low is placed at point K, the input to NAND gate 77, thereby causing output point G to stay high. Such a condition occurs in response to deactuation of of punch card and badge switch 21 or credit card switch 23 or an end of transmit code being sensed by the card reader.

Figure 5:
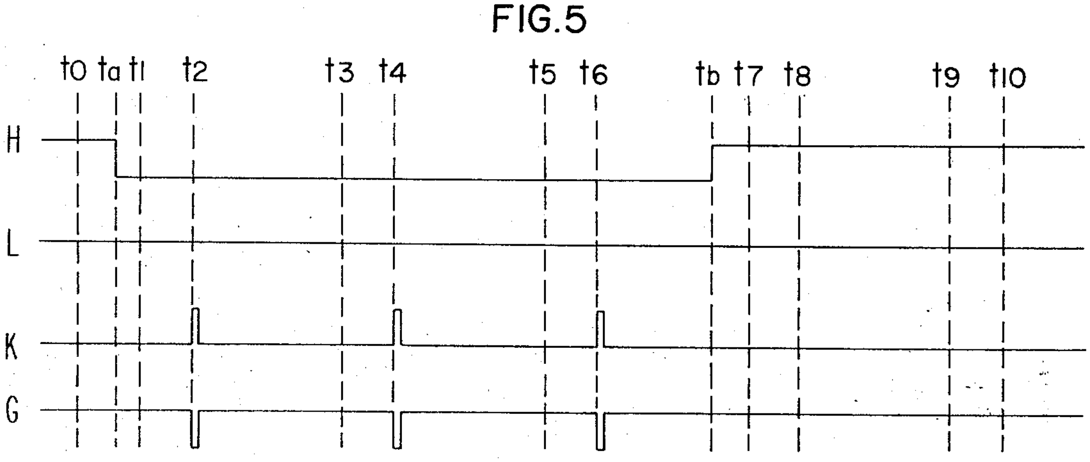
FIG. 5 (G–L) is a pulse diagram of certain waveforms that are present in the inhibit section of FIG. 3, at various points in time.

We now make reference to FIG. 5 which illustrates what occurs in the circuit of FIG. 3 when a card that only actuates and deactuates switch 21 is processed.

At time $t_0$, the signal at point H, the input to NAND gate 81, which is the signal received from punch card and badge switch 21, is high because the leading edge of a tabulating card or identification badge has not yet passed that point. With point H high, point K, the output of NAND gate 81, will be low thereby causing point G, the output 78 of NAND gate 77, to be high. With point K, the input to NAND gate 77 low, point F, the output of NAND gate 75, cannot go high and, therefore will not change output point G and it will remain high. When the leading edge of a card passes switch 21 causing its actuation at $t_a$, the signal at point H goes from a high to a low. The signal at point L, one input to gate 85, remains high at $t_a$ because the tabulating card or identification badge is not wide enough to actuate credit card switch 23. With the signal at point H low, the output of NAND gate 81 tries to go high, but because point F is low at this time, point K stays low and point G will see no change.

Point K will stay low as long as point F stays low, that is until time $t_2$ when the first column count pulse is generated. At that time, point K will go high because point F goes high thereby causing point G to go from a high to a low. This will occur again at time $t_4$ when the second pulse is generated, at $t_6$ and so on until time $t_b$ when the trailing edge of the card is sensed by switch 21. At this time, point H will go high, and because of NAND gate 81, point K, which is already low because of the output of NAND gate 75, will stay low even though point F tries to go high at time $t_8$. The effect of point K staying low after time $t_b$ is that point G (output 78) stays high, thereby inhibiting the output of pulses from the circuit.

Figure 6:
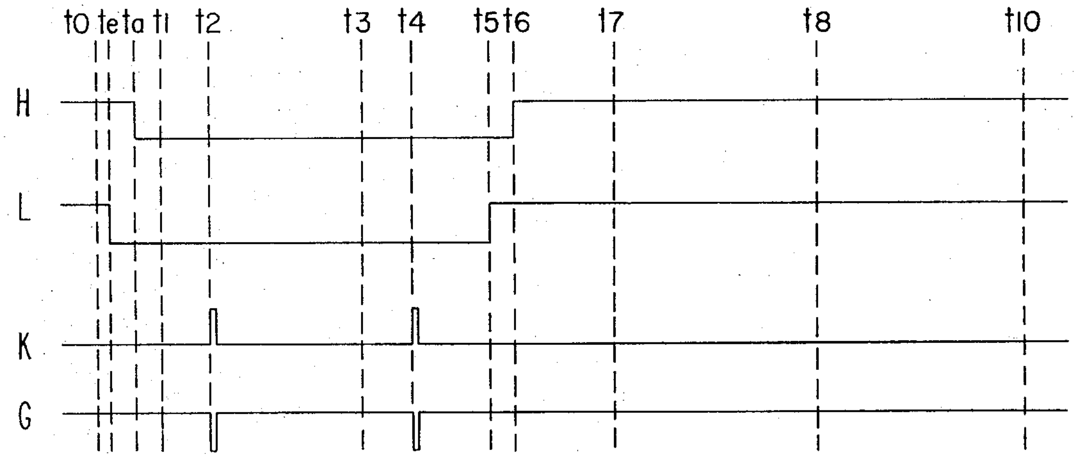
FIG. 6 (G–L) represents certain other waveforms that are present in the inhibit section of FIG. 3, at various times.

Assuming now that a credit card is inserted into the reader, both switches 21 and 23 will be actuated. FIG. 6 illustrates the various states of the circuit of FIG. 3 when a credit card is being read.

We turn our attention first to an explanation of the overall operation of NAND gates 89 and 91, latching circuit 93 and NAND gate 85, which serve to keep point K, the input to NAND gate 77, from being affected prior to or after switch 23 is actuated. However, when switch 23 is deactuated, or in other words, point L goes from a low to a high, a low is caused to be placed on point K thereby inhibiting the generation circuit.

The specific operation of the elements of FIG. 3 to perform this function is as follows: NAND gate 85 receives one input from switch 23 (FIG. 1) and another input from latching circuit 93. When point L is high, the output of latching circuit 93 is latched into a low. When point L goes low, the output of latching circuit 93 is latched high a short time thereafter, in response to point H going low. With the output of latching circuit 93 latched high, deactuation of switch 23 (FIG. 1) causes point L to go from a low to a high, in turn causing NAND gate 85 to place a low on point K thereby inhibiting the output of generation circuit 54. A short time thereafter point H will go high because of the deactuation of switch 21 (FIG. 1) thereby causing NAND gate 87 to reset latching circuit 93 to an output low. At this time, NAND gate 81 continues to place a low on point K.

Therefore, the resultant operation of both switches 21 and 23 together will be as follows: At time $t_0$, the leading edge of the credit card has not yet initiated switches 21 and 23. At $t_e$, the leading edge causes switch 23 to be actuated thereby dropping point L from a high to a low, as shown. At $t_a$, switch 21 is actuated dropping point H from a high to a low.

As was explained earlier, if point H is high, point K will be low regardless of what point F tends to be, and output 78, point G, will be high. However, when point H goes low, this inhibit function is removed and point K is high. But, because point F is low, output point G will stay high until point K goes high.

At that time, point G will go low producing the first strobe pulse. This occurs, as was seen earlier, at $t_2$. Another pulse appears at output point G, at $t_4$ and so on, until the trailing edge of the credit card is sensed by switch 23 at time $t_c$. This causes point L to go high causing poing K, which is already low because point F is low, to stay low, at $t_6$, $t_8$, $t_{10}$, etc., when poing F would normally go high, thereby inhibiting output 78 of the circuit from producing further pulses.

Figure 7:
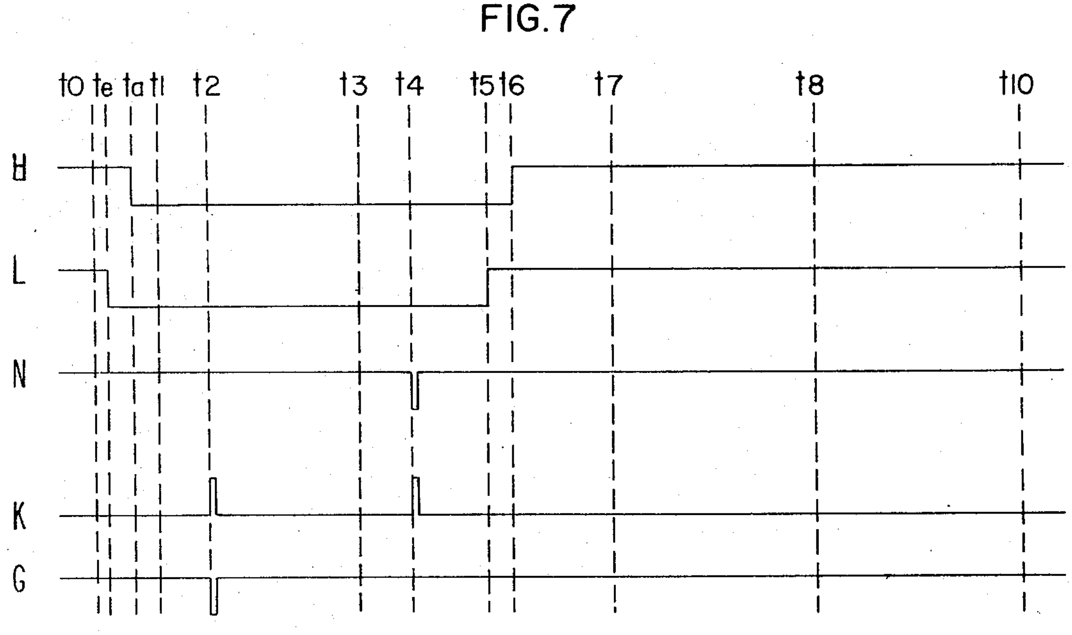
FIG. 7 (G–N) represents certain additional waveforms that are present in the inhibit section of FIG. 3.

Let us now consider the processing of a card which is as wide as a credit card and has an end of text code punched into the last column of its information field. FIG. 7 illustrates the various waveforms that occur in the circuit of FIG. 3 when such a card is processed.

As was explained in connection with FIG. 6 at $t_a$, both points H and L are at a low. At this time, point K is no longer a forced low because of the input at point 79. Therefore, if point F should go high, point K will go high. This occurs at $t_2$ of FIG. 7, thereby generating a pulse at point G. Assuming that this particular card has an end of text code in its next column of information, a negative going signal is placed on line 95, point N, by encoder 96. Point K because of the operation of NAND gate 97 and bistable multivibrator 99 which is clocked by the output of NAND gate 97 will go low thereby inhibiting output 78, regardless of the fact that at $t_4$ point F goes high. Point K stays low because of bistable multivibrator 99, which is of a type well known in the art, until point H goes high, thereby indicating that the trailing edge of the card has passed switch 21. At this time, bistable multivibrator 99 will be switched back to its other stable state placing a high on the line connected to point K. However, since point H is high, point K will remain low because of NAND gate 81 and, therefore, point G will remain high thereby inhibiting pulses which are, in effect, being produced by NAND gate 75 at times $t_4$, $t_6$, $t_8$, $t_{10}$, etc.

A card that is narrower than a credit card having an end of transmit code punched into one of its columns in the information field will function in substantially the same manner as above explained to inhibit the pulse generation circuit upon sensing the end of transmit code. The only difference of consequence will be that at $t_a$ only point H will be low, point L will remain high.

From the foregoing disclosure, it can be seen that the invention provides for a card reader that is capable of reading information from cards such as a standard size punch card, a punched identification badge, or a punched credit card, providing accurate column indicating signals and inhibiting the column indicating section of the reader after the end of the information field on the credit and standard punched card is read or at any time prior to the end of the information field being read on the credit card, standard punched card or identification badge. It should be understood, however, that the foregoing disclosure relates only to a preferred embodiment of the invention and that numerous modifications or alterations may be made therein without departing from the spirit and the scope of th invention as set forth in the appended claims.

I claim:

1. In combination with a reading apparatus having a station for reading documents and emitting pulses in response thereto, said documents having information coded thereon in rows and columns said columns having respective predetermined physical locations with respect to the leading and trailing edges of the document as it is procesed through the apparatus, the improvement therein comprising:

means for inhibiting the output of the pulses from said reading station during the continuation of the operation of said reading apparatus; and variably positionable means actuated by the trailing edge of a document for actvating said inhibiting means immediately after the reading of a column selected form a plurality of said columns by the position of said variably positionable means.

2. The improved apparatus of claim 1 wherein said variably positionable activating means includes a switch in the path of said document through said reading apparatus, said switch being variably positionable with respect to said reading station to determine after the reading of which column of information said inhibiting means is activated.

3. The improved apparatus of claim 2 further including independent means actuated by the trailing edge of the document for shutting off the apparatus, said independent means including delay means for permitting the trailing edge to clear the reading station before the apparatus is shut off.

4. In combination with a reading apparatus having a station for reading documents and emitting pulses in response thereto, said documents having information coded thereon in rows and columns, said columns being evenly spaced apart and forming an information field, the number and physical location of said columns having a predetermined relationship with the width and trailing edge of the document as the document is processed through the apparatus, the improvement therein comprising:

means for guiding randomly recived documents of differing but specified widths into the apparatus for reading;

means for inhibiting the output of the pulses from said reading station during the continuance of the operation of said reading apparatus; and positionable means individual to said documents having differing but specified widths actuated by the trailing edge of a document for activating said inhibiting means immediately after the reading of a selected one of a plurality of said columns.

5. The improved apparatus of claim 4 wherein said inhibiting means further includes:

an encoder responsive to an end of transmit code in said information field to generate an end of transmit signal; and a circuit responsive to the signal generated by said encoder to inhibit the pulses from said reading station.

6. The improved apparatus of claim 4 wherein said positionable means includes at least two switches in the path of said document through said reader, each switch positioned a different distance from said guiding means, the position of said switches being adjustable with respect to said guiding means to predetermine, according to the width of the card, to what card it will respond, said switches also being adjustable with respect to said reading station to respectively predetermine after which column of information on the respective card said inhibiting means is activated.

7. The improved apparatus of claim 6 further including independent means actuated by the trailing edge of the documents for shutting off the apparatus after each document has passed said reading station.

8. In combination with an apparatus for automatically reading individual cards that vary in aize from card to card, each card having a coded information field thereon that may vary in length, the columns and rows of each card being positioned in a standard relationship with respect to two predetermined orthogonal edges of each card, and wherein cards of a predetermined width have additional information imprinted on the portion of the card trailing said coded information, said apparatus having a means for aligning a card with respect to the two orthogonal edges prior to advancing the card through the apparatus and a means for reading said information field at a read line and emitting pulses in response thereto while said card is being advanced through said apparatus, the improvement therein comprising:

means independent from said reading and pulse emitting means for indicating when a column of information is being read by said reading means;

means for inhibiting said indicating means and the pulses from said reading means during the continuance of operation of said apparatus; and positionable means actuated by the trailing edge of the card for activating said inhibiting means immediately after the last coded information column in said information field on said card of predetermined width is read and before said additional imprinted information reaches said read line.

9. The apparatus of claim 8 wherein said inhibiting means comprises:

a first switch responsive to all cards advanced through said apparatus;

a second switch only responsive to a card of said predetermined width; and a circuit responsive to the signals from said first and second switches for inhibiting said indicating means and the pulses from said reading means.

10. The apparatus of claim 9 wherein said inhibiting means further comprises:

an encoder responsive to an end of text code in said information field for generating an end of transmit signal; and a circuit responsive to the signal generated by said encoder for inhbiting said indicating means.

11. The apparatus of claim 10 wherein said second switch is positionable with respect to said reading means and wherein the trailing edge of a card having sufficient width to be sensed by said switch deactivates said switch immediately after the last relevent information bearing column on said card passes said reading means.

12. The apparatus of claim 11 wherein said first switch is positionable with respect to said reading means.

13. The apparatus of claim 12 wherein said switch responsive circuit comprises:

a first logic path responsive to the signal from said first switch for enabling and inhibiting said indicating means; and a second logic path responsive to the signal from said second switch for inhibiting said indicating means.

14. The apparatus of claim 8 wherein said column indicating means comprises:

a column count wheel generating a pulse every other time that a column of information is in position to be read by said reading means;

a pulse generating circuit responsive to the pulses generated by said column count wheel for generating a pulse each time a column of information is being read by said reading means.

15. The apparatus of claim 14 wherein said inhibiting means comprises:

a first switch responsive to all cards advanced through said apparatus;

a second switch only responsive to a card of a predetermined width; and a circuit responsive to the signals from said first and second switches for inhibiting said pulse generating circuit.

16. The apparatus of claim 15 wherein said inhibiting means further comprises:

an encoder responsive to an end of transmit code in said information field for generating an end of transmit signal; and a circuit responsive to the signal generated by said encoder for inhibiting said indicating means.

17. The apparatus of claim 16 wherein said second switch is positionable with respect to said aligning means and reading means and wherein the trailing edge of a card having a predetermined width deactivates said switch immediately after the last relevant information bearing column on said card passes said reading means.

18. The apparatus of claim 17 wherein said first switch is positionable with respect to said aligning means and reading means.

19. The apparatus of claim 18 wherein said switch responsive circuit comprises:

a first logic path responsive to the signal from said first switch for enabling and inhibiting said pulse generating circuit; and a second logic path responsive to the signals from said second switch for inhibiting said pulse generating circuit.

20. An apparatus for reading documents having information coded thereon in rows and columns said columns being evenly spaced apart and having respective predetermined physical locations with respect to the leading and trailing edges of the document as it is processed through the apparatus, the improvement comprising:

a station for reading said documents and for emitting pulses in responsive thereto;

means for inhibiting pulses from said reading station during the continuation of the operation of said apparatus;

positionable means actuated by the trailing edge of a document for activating said inhibiting means immediately after a selected coded information column has been read; and means independent of said positionable means actuated by the trailing edge of a document for shutting off the apparatus, said independent means including delay means for permitting the trailing edge to clear the reading and pulse emitting station before the apparatus is shut off.

* * * * *